United States Patent [19]

Nakamura

[11] Patent Number: 5,757,648
[45] Date of Patent: May 26, 1998

[54] MACHINE TOOL CONTROL SYSTEM

[76] Inventor: Kaoru Nakamura, 2-18-13, Takamori, Isehara-shi Kanagawa, 259-11, Japan

[21] Appl. No.: 713,848

[22] Filed: Sep. 12, 1996

[51] Int. Cl.[6] .............. G06F 19/00; G09G 7/64; G09G 7/66
[52] U.S. Cl. .............. 364/474.11; 364/474.16; 364/474.17; 364/468.05; 364/468.06
[58] Field of Search .............. 364/191, 474.11, 364/474.16, 468.01, 468.02, 468.22, 401, 402, 408, 131, 138, 132, 134; 395/904, 200, 275, 325, 600

[56] References Cited

U.S. PATENT DOCUMENTS

| | | | |
|---|---|---|---|
| 4,628,435 | 12/1986 | Tashiro et al. | 364/130 |
| 4,807,108 | 2/1989 | Ben-Arieh et al. | 364/148 |
| 4,885,717 | 12/1989 | Beck et al. | 364/900 |
| 4,972,328 | 11/1990 | Wu et al. | 364/513 |
| 5,014,208 | 5/1991 | Wolfson | 364/468 |
| 5,051,898 | 9/1991 | Wright et al. | 364/200 |
| 5,241,465 | 8/1993 | Oba et al. | 364/401 |
| 5,357,420 | 10/1994 | Gohi | 364/131 |
| 5,446,669 | 8/1995 | Yamashita et al. | 364/468 |
| 5,461,570 | 10/1995 | Wang et al. | 364/468 |
| 5,485,620 | 1/1996 | Sadre et al. | 395/700 |
| 5,488,564 | 1/1996 | Ikeda | 364/474.16 |
| 5,509,116 | 4/1996 | Hiraga et al. | 395/155 |
| 5,546,301 | 8/1996 | Agrawal et al. | 364/140 |
| 5,557,549 | 9/1996 | Chang et al. | 364/551.01 |
| 5,576,946 | 11/1996 | Bender et al. | 364/146 |
| 5,594,858 | 1/1997 | Blevins | 395/326 |
| 5,603,018 | 2/1997 | Terada et al. | 395/561 |
| 5,611,059 | 3/1997 | Benton et al. | 395/326 |

*Primary Examiner*—Joseph Ruggiero
*Assistant Examiner*—Ramesh Patel
*Attorney, Agent, or Firm*—Greenblum & Bernstein P.L.C.

[57] ABSTRACT

A machine tool control system is provided that controls a plurality of machining equipment by transferring, from a tool center, schedules for each machining equipment to a plurality of terminals which correspond to the plurality of machining equipment, respectively. The machine tool control system includes a controller for storing a plurality of schedules for the plurality of machining equipment. During operation, the system analyzes the current operating condition of the plurality of machining equipment through the respective terminals, and selects a schedule which is currently capable of being processed by each of the plurality of machining equipment from the plurality of schedules. The schedule that is selected is then transferred to each of the plurality of terminals corresponding to each of the plurality of machining equipment. A machining program converting system is also provided that converts an original machining program corresponding to one of the machining equipment into a compatible machining program for a substitutive machining equipment when the current operating condition of the machining equipment is determined to be in an overload condition or a trouble condition, and when it is determined that the original machining program is not compatible for the substitutive machining equipment.

26 Claims, 12 Drawing Sheets

FIG.5

| hi | PRODUCT NAME | QUANTI-TIES | MACHINE EQUIPMENT | DELIVER TIME | MACHINING PROGRAM NAME | |
|---|---|---|---|---|---|---|
| $h_1$ | PO1 | 30 | A | IMMEDIATE | NCT1P | |
| $h_2$ | PO2 | 15 | B OR C | IMMEDIATE | NCT2P | |
| $h_3$ | PO3 | 20 | N OR B | IMMEDIATE | NK | |
| $h_{10}$ | PO10 | 60 | B OR N | IMMEDIATE | NCT10P | |
| $h_{11}$ | PS1 | 40 | B OR A | NORMAL | NP1 | |
| $h_{12}$ | PS3 | 15 | B | NORMAL | NP2 | |
| $h_{50}$ | PS10 | 30 | B OR A | LATER | NP10 | |

- SIMPLIFIED CONVERTING METHOD OF MACHINING PROGRAM NCT# CONVERTED INTO NCT#2
- MECHANIC CONVERSION OF SIMPLE G-CODE LEVEL

ORIGINAL MACHINING PROGRAM NCT#1

```
G92×100, 0  Y1000, 00
  ⋮
G90×500, 0  T201
G92×100, 0  Y200, 0  T306
  ⋮
G50
```

CONVERTED MACHINING PROGRAM NCT#2

```
G92×1830, 0  Y1270, 0
  ⋮
G90×500, 0  T229
G90×100, 0  Y200, 0  T309
  ⋮
G50
```

5,757,648

MACHINE TOOL CONTROL SYSTEM

BACKGROUND OF THE INVENTION

This invention relates to a machine tool control system, more particularly to a machine tool control system for equally assigning schedules to a plurality of machine equipment.

FIG. 1 shows a schematic structure of a conventional machine tool control system. The machine tool control system illustrated in FIG. 1 comprises a tool center 1, a terminal 5 for an Numerically Controlled Turret (NCT) punch press/laser 3, a terminal 9 for a bender 7, and a terminal 13 for an Flexible Manufacturing System (FMS) 11, which are all connected to an Ethernet 15.

In such a machine tool control system, an operating planner operates a computer of the tool center 1 to make an operation schedule for one day for each machine equipment based on a machining schedule of which and how many products should be produced by a predetermined date and/or time (hereinafter simply called "a schedule").

Thereafter, a scheduler for each equipment in the tool center 1 correspondingly transmits the prepared schedules to the terminal 5, the terminal 7, or the terminal 13, thereby to operate the machine, respectively.

On the other hand, there is a case where a schedule for each equipment is made by the terminal 5, the terminal 9 and the terminal 13. Even in this case, each terminal transmits the prepared schedule to each equipment.

In the conventional manner as shown in FIG. 2, the NCT/laser tool-machine 3 (hereinafter called "machine equipment A"), the bender 7 (hereinafter called "machine equipment B"), and the FMS 11 (hereinafter called "machine equipment N") have been assigned schedules of a schedule for machine equipment A, a schedule for machine equipment B, and a schedule for machine equipment N, respectively, and a scheduler $A_s$, a scheduler $B_s$ and a scheduler $N_s$ of each equipment transmit these schedules to the corresponding machine equipment A, the machine equipment B, or the machine equipment N.

In such a schedule allotting system, the machine equipment A, the machine equipment B, or the machine equipment N might be out of order, or, one of these equipment might be placed in over-loaded condition.

Referring to FIG. 3, for example, when the schedule of May 28th for the machine equipment A is operated by the machine equipment A and the machine equipment A is out of order, the operating planner searches a machine equipment which is capable of operating with the schedule, and the schedule is transferred to the searched machine equipment side by manipulating a keyboard or a mouse and the like.

The schedule for the machine equipment A illustrated in FIG. 3 is transferred after the schedule for the machine equipment B since the machine equipment B is set at the schedule on May 28th.

In the conventional schedule allotting system of the machine tool control system as described above, the schedule is predetermined for each equipment and assigned thereto.

Accordingly, there is a problem when one of these equipment is out of order or placed in over-loaded condition, the operating planner has to process to transfer the schedule for the machine equipment to another available equipment or a next available equipment.

In addition, in the conventional schedule allotting system, the schedule is simply assigned to each machine equipment from the first section of the machining schedule.

Consequently, there is a case where some machine equipments complete their assigned work early, while others are still being operated until late hours.

SUMMARY OF THE INVENTION

The present invention is made to solve problems in the art, such as those described above. It is an object of the present invention to provide a machine tool control system for automatically and equally assigning schedules to each machine equipment according to the condition of each machine equipment.

It is another object of the present invention to provide a machine tool control system having a plurality of machine equipments and that transfers, from a tool center, schedules for each machine equipment to a plurality of terminals which correspond to the plurality of machine equipments, respectively. According to an aspect of the invention, the machine tool control system includes a controller for storing a plurality of schedules for the plurality of machine equipments from the tool center. During operation, the system analyzes the current operation condition of the plurality of machine equipments through the plurality of terminals, and selects a schedule which is currently capable of being processed by each of the plurality of machine equipments from the plurality of schedules. The selected schedule is transferred to each of the plurality of terminals corresponding to each of the plurality of machine equipments.

According to a preferred aspect of the invention, the controller may include: a schedule file for storing therein a plurality of schedules consisting of at least a product name, quantities, a delivery time, and a usable machine equipment name. An equipment condition analyzing section may also be provided for receiving the operation condition from the plurality of terminals to the current condition of the plurality of machine equipment. In addition, the controller may include a schedule assigning section for reading an analyzed result of the equipment condition analyzing section, and retrieving the schedule from the schedule file based on the analyzed result to assign the schedule to a corresponding machine equipment. Further, a schedule transfer section may be provided for transferring the schedule assigned by the schedule assigning section to a terminal of the corresponding machine equipment.

According to another aspect of the invention, the schedule assigning section may assign, when the analyzed result indicates that a machine equipment exists which is in condition waiting for an instruction of processing, a schedule capable of being processed by the machine equipment to the machine equipment from the schedule file.

According to yet another aspect of the invention, the schedule assigning section may retrieve, when the analyzed result indicates that a machine equipment exists which is placed in over-loaded condition, a substitutive machine from the schedule file that is capable of processing a schedule transferred to the machine equipment which is placed in over-loaded condition, and assign the schedule to the retrieved substitutive machine.

According to another aspect of the invention, the schedule assigning section may retrieve, when the analyzed result indicates the machine equipment exists which is placed in trouble condition, a substitutive machine from the schedule file that is capable of processing a schedule transferred to the machine equipment which is placed in trouble condition, and assign the schedule to the retrieved substitutive machine.

According to another preferred aspect of the present invention, a machine tool control system may further include a machining program file having a plurality of machining programs registered therein for the plurality of machine equipments and; a machining program converting section for determining whether or not a machining program corresponding to the over-loaded or the troubled machine equipment is compatible for the substitutive machine when the schedule is assigned or allocated to the substitutive machine, and converting the machining program into a compatible machining program when the machining program is not compatible. The system may also include a machining program transfer section for transferring the compatible machining program converted by the machining program transfer section to the substitutive machine.

According to another aspect of the invention, the schedule assigning section may include an automatic Computer Aided Manufacturing (CAM) module for reading a desired machining figure data generated by a Computer Aided Design (CAD) system to generate a machining program which specifies a machining procedure based on the desired machining figure data, and a machining-time estimating sections for estimating a machining time in each machine equipment based on the machining program, a machine equipment parameter, tool record information, and cut record information. A handling machine determining section may also be provided for reading the current condition of the plurality of machine equipment to determine the handling machine equipment from the plurality of machine equipment based on the current condition, previous machining record times of the plurality of machine equipment, and the estimated machining time.

According to yet another aspect of the present invention, the controller may further include a machining program file having a plurality of machining programs registered therein for the plurality of machine equipment, respectively, and a machine equipment file for storing a machine equipment parameter. In addition a tool/cut record information file may be provided for storing the tool record information and the cut recording information and an machining-time estimation result file may be provided for storing the estimated machining time. A machining record file may also be provided for storing the previous machining record times of each machine equipment.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is an explanatory view showing a schedule file in the first embodiment;

DESCRIPTION OF THE PREFERRED EMBODIMENTS

Preferred embodiments of this invention will be clearly understood from the following description by referring to the accompanying drawings.

<Embodiment 1>

Figure 1:
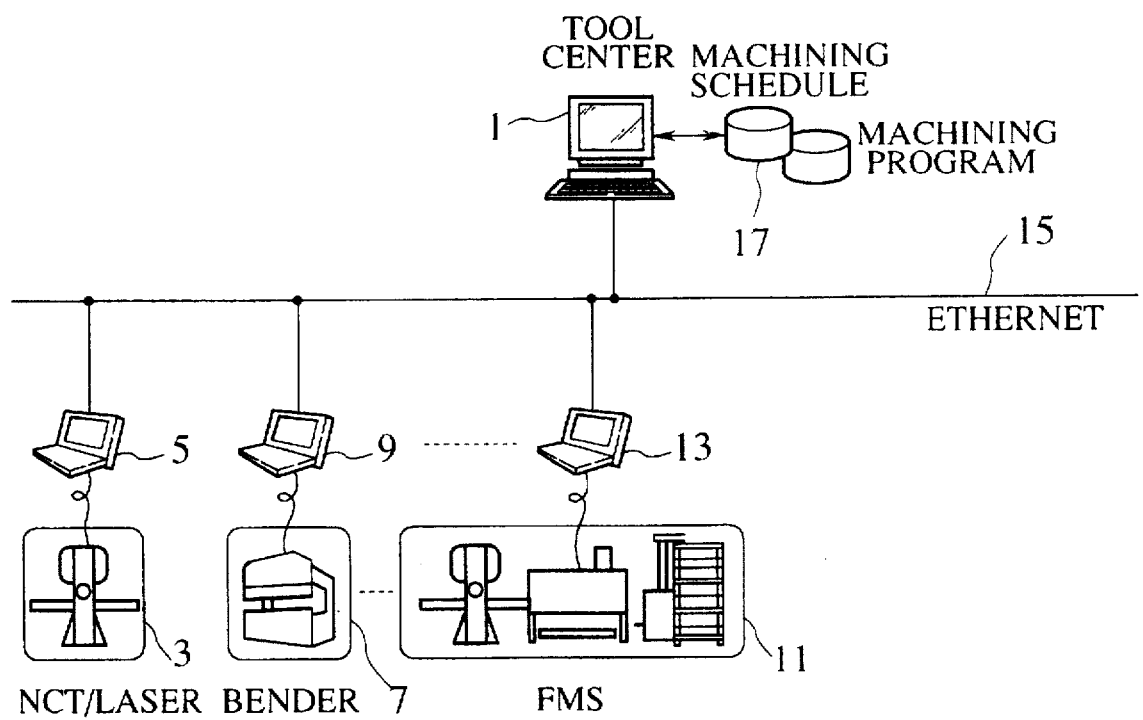
FIG. 1 is a schematic view showing a structure of a conventional machine tool control system.
Figure 2:
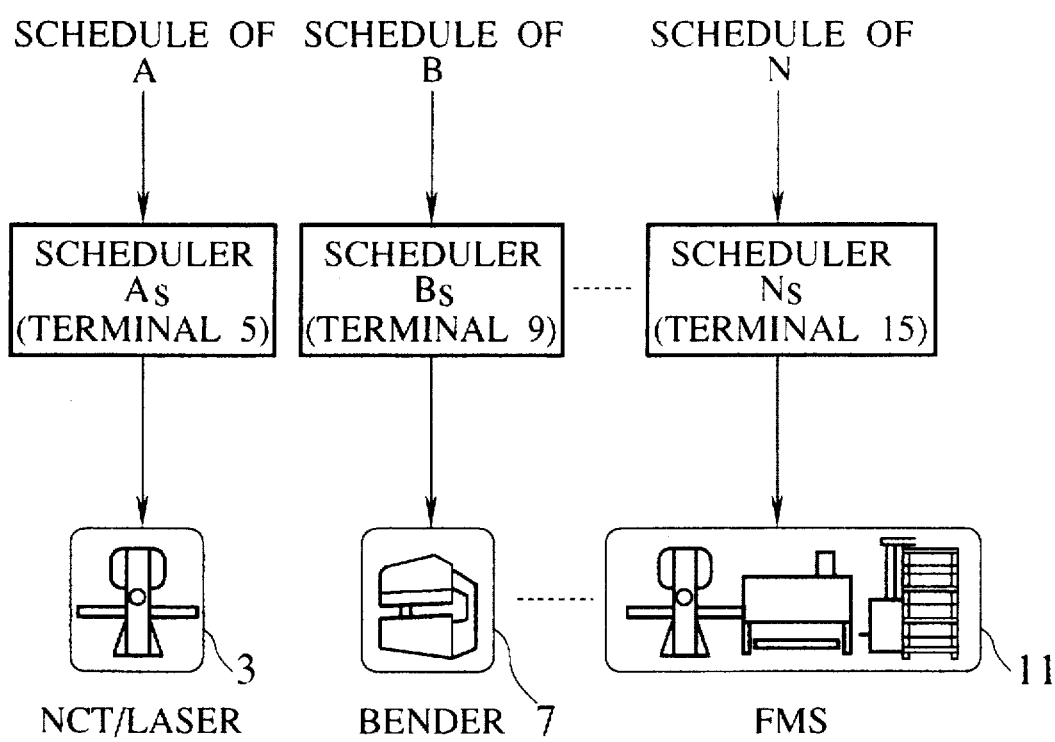
FIG. 2 is an explanatory view of an operational concept of a conventional machine tool control system.
Figure 3:
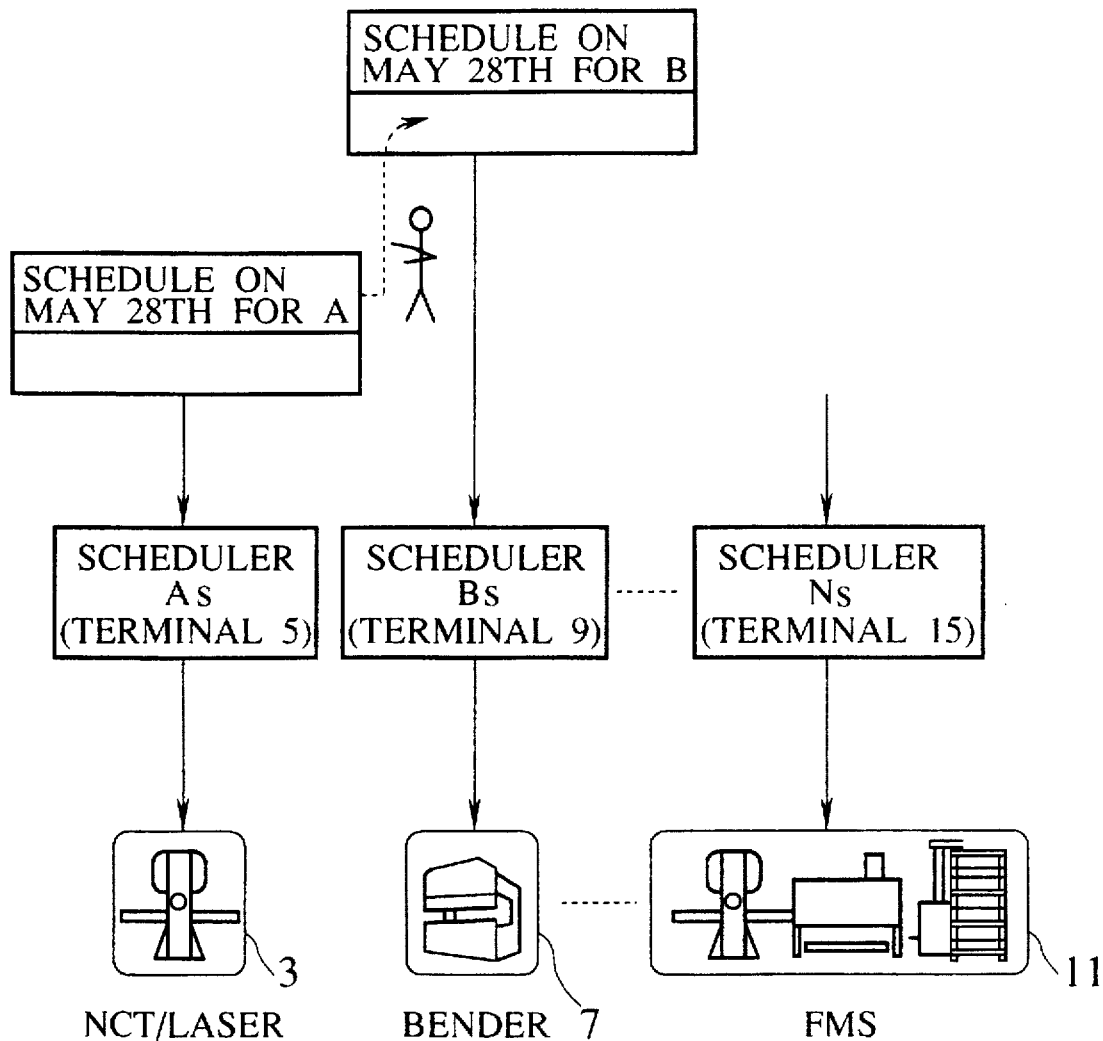
FIG. 3 is an explanatory chart of a transfer and assignment of a schedule of prior art.
Figure 4:
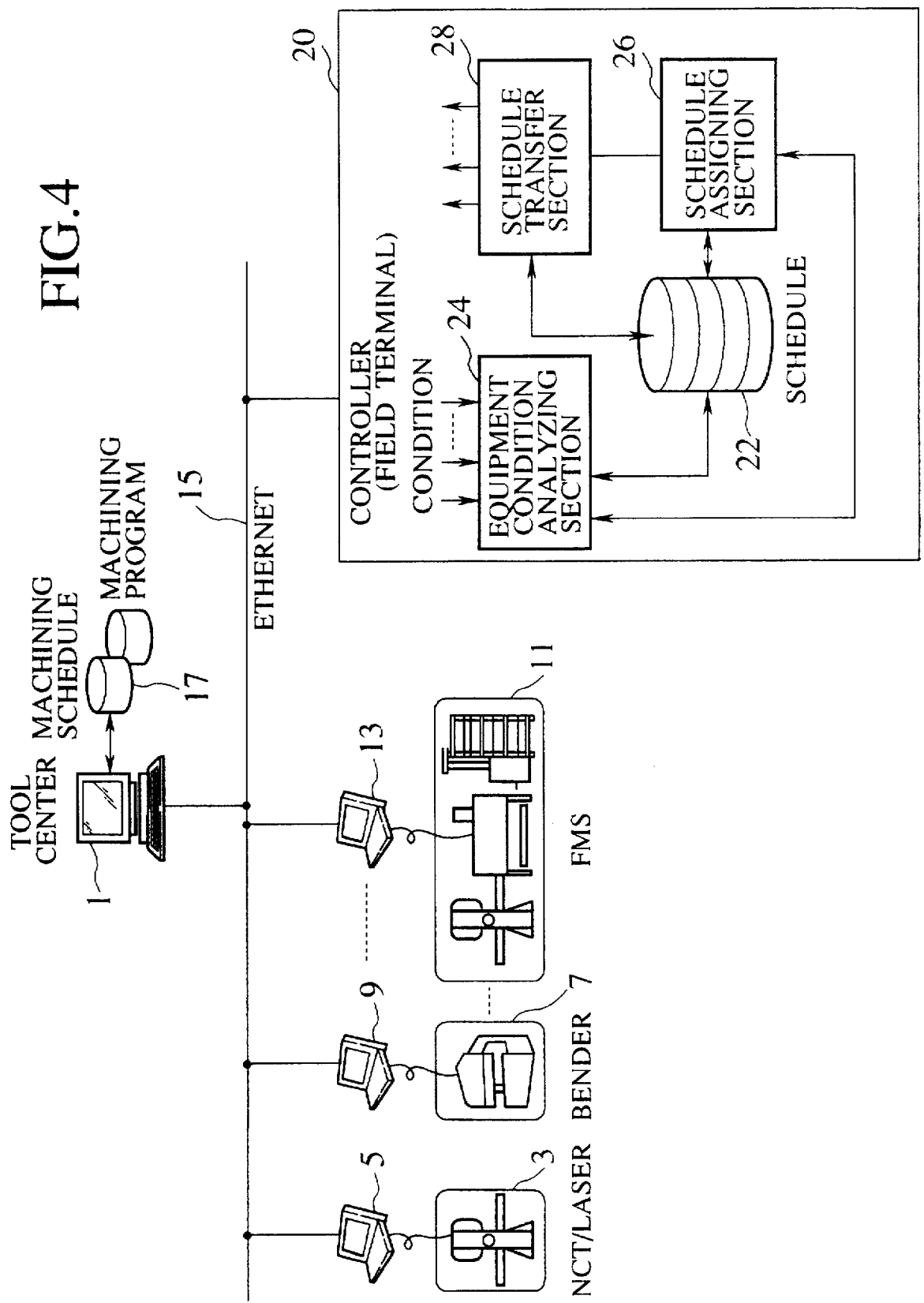
FIG. 4 is a schematic view showing a structure of a machine tool control system according to a first embodiment of this invention.

FIG. 4 is a schematic view showing a structure of a machine tool control system of a first embodiment according to the present invention. The machine tool control system as shown in FIG. 4 has a controller 20 for collectively storing all schedules of each equipment to analyze the condition of each machine equipment, and for automatically assigning the schedule to machine equipment capable of currently operating with the schedule based on the analyzed result.

Referring to FIG. 4, the controller 20 comprises a schedule file 22 in which schedules of each machine equipment are stored, an equipment condition analyzing section 24, a schedule assigning section 26, and a schedule transfer section 28.

The equipment condition analyzing section 24 makes the machine equipment A, the machine equipment B, ... and the machine equipment N transmit their operating conditions from a terminal 5, a terminal 9 ... and a terminal 13 through an Ethernet 15 to analyze the current condition of each machine equipment.

The equipment condition analyzing section 24 analyses the condition of the machine equipments, for example, whether they are in waiting condition (hereinafter called "available condition"), in over-loaded condition, in trouble, or in the proper operating condition according to their assigned schedule, and the like.

When there is any equipment indicating either one of these conditions, the equipment condition analyzing section 24 informs the schedule assigning section 26 of the machine equipment name Pi and its analyzed condition result Fi.

The schedule assigning section 26 reads the machine equipment name Pi and the analyzed condition result Fi from the equipment condition analyze section 24, and retrieves the machine equipment name Pi which is capable of operating the processing based on the analyzed condition result Fi from the schedule file 22 to assign the schedule.

The schedule transfer section 28 transfers the schedule from the schedule assigning section 26 to the corresponding terminal 5, the terminal 9 ... or the terminal N.

As shown in FIG. 5, the schedule file 22 stores therein a plurality of schedules hi consisting of product name, quantities, available machine equipment, delivery time, machining program name and the like.

The indication of "immediately" in the item of delivering time of the schedule hi represents, for instance, "within today", "normal" represents "within 3 days from today" and "later" represents "within one week from today".

Figure 6:
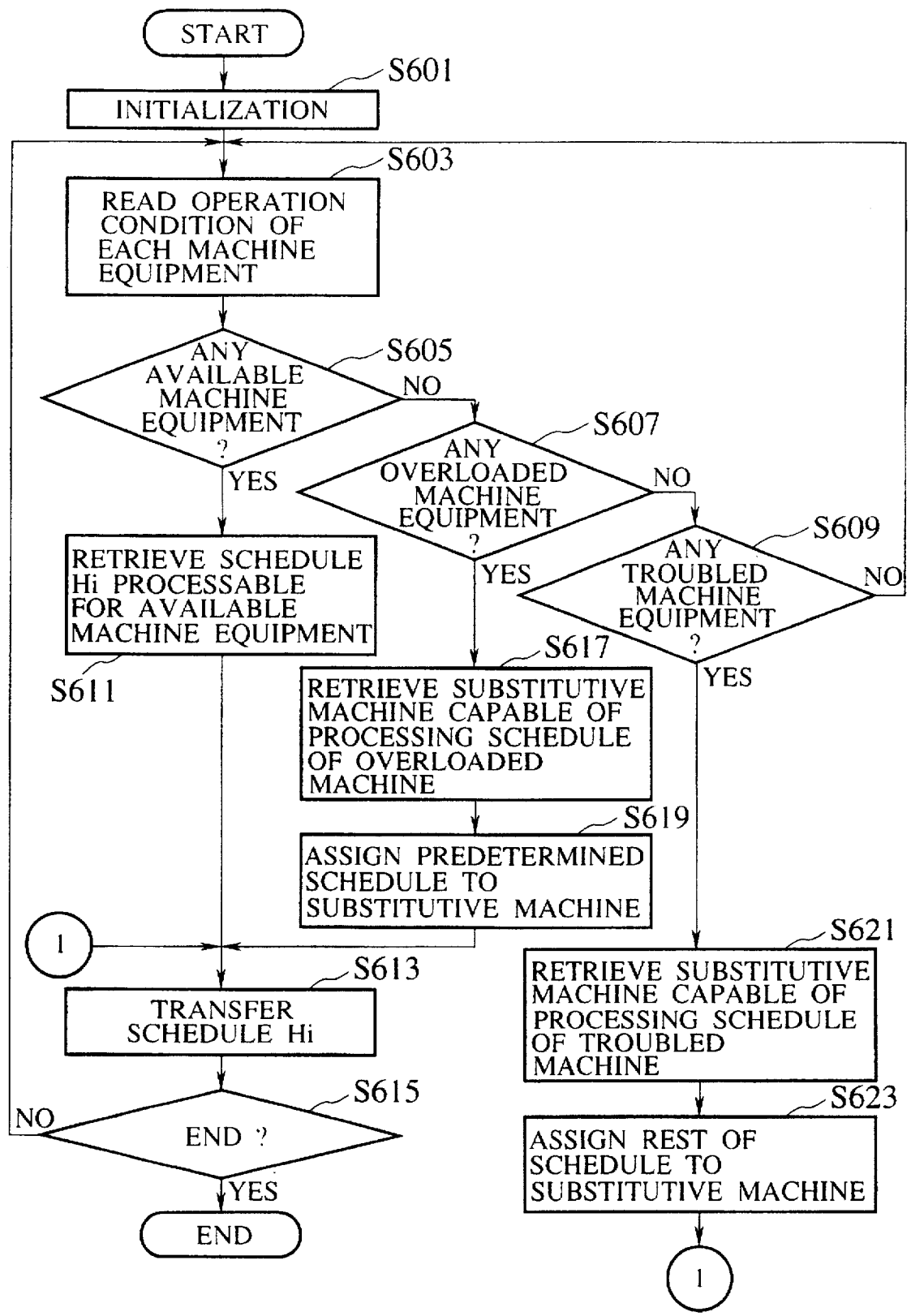
FIG. 6 is a flow chart explaining an operation of a first embodiment.

The description will now be made with regard to the operation of the machine tool control system as descried above by referring to a flow chart in FIG. 6.

First, the schedule assigning section 26, as the initial setting, selects the schedule hi of each machine equipment A, B, ... and N based on the schedule file 22, to be transferred from the schedule transfer section 28 (Step 601). In this embodiment, for example, the data of the schedule of the deliver time immediately as shown in FIG. 5 are sequentially transferred at first.

For example, the schedule hi for producing a product "PO 1" for thirty quantities using a machining program "NCT 1" is transferred to the machine equipment A.

Thereafter, the equipment condition analyzing section 24 reads the operating condition of the machine equipment A, the machine equipment B, ... and the machine equipment N from the terminal 5, the terminal 9, ... and the terminal 13 (Step 603).

Each terminal 5, 9 and 13 of these machine equipments has a flag-memory, respectively, and it is possible to set a flag corresponding to its operation condition. For example, the flag is set to "01" when the machine equipment is in available condition, and the flag is set to "10" when the machine equipment is in trouble condition.

Thereafter, the equipment condition analyzing section 24 determines by this operation condition whether or not there is any available machine equipment Ra which indicates the condition waiting for the instruction of the processing (Step 605).

When determined in Step 605 that there is no available machine equipment Ra, it is determined by judging from the operation condition of each machine equipment whether or not there is any over-loaded machine equipment Rb (Step 607).

When determined in Step S607 that there is no overloaded machine equipment Rb, it is determined by judging from the operation condition of each machine equipment whether or not there is any troubled machine equipment Rc (Step 609).

When determined in Step 609 that there is no troubled machine equipment Rc, the process goes back to the Step 603.

Namely, the processes from Step 603 to Step 609 are for analyzing the operation condition of each machine equipment, and when the analyzed condition result Fi does not indicate any of the above mentioned conditions, the process goes back to the Step 603.

When determined in Step 605 that there is at least one available machine equipment Ra among the machine equipments, from the schedule file 22, the schedule assigning section 26 retrieves the schedule hi with which the available machine equipment Ra can be operated (Step 611). The schedule assigning section 26 delivers the retrieved schedule hi to the schedule transfer section 28 so as to transmit it to the available machine equipment Ra (Step 613). For example, when the terminal 5 of the machine equipment A is flagged indicating the available condition after the schedule h1 is transferred to the machine equipment A, the schedule h11 is transferred to assign the machine equipment A instead of the machine equipment B, since it is indicated based on the schedule file 22 in FIG. 5 that the product name "PS1" can be processed by the machine equipment B, or the machine equipment A.

Thereafter, determination is made whether or not the system is completed (Step 615). When it is not completed, the process goes back to the Step 603.

When determined in Step 607 that there is at least one over-loaded machine equipment Rb, the schedule assigning section 26 retrieves a substitutive machine Di capable of processing with the schedule of the over-loaded machine equipment Rb from the schedule file 22 (Step 617). The pre-assigned schedule hp is assigned to the retrieved substitutive machine Di (Step 619), and the process goes back to the Step 613 to transfer the schedule hi to the substitutive machine Di.

For instance, the terminal 9 of the machine equipment B is flagged to indicate the over loaded condition after a schedule h2 illustrated in FIG. 5 is transferred thereto and machine equipment N is flagged to indicate its available condition. According to data of a schedule h3 of FIG. 5, the available machine equipment may be the machine equipment N, therefore, the machine equipment N is assigned with the schedule h3 of FIG. 5 as the substitutive machine Di of the machine equipment B.

When determined in Step 609 that there is at least one troubled machine equipment Rc, a substitutive machine Dp capable of processing with the schedule of the troubled machine equipment Rc is retrieved from the schedule file 22 (Step 621). Then, the substitutive machine Dp is assigned with the rest of the schedule hn of the troubled machine equipment Rc (Step 623), and the process goes back to the Step 613 to transfer the rest of the schedule hi to the substitutive machine Dp.

For example, when the machine equipment B is placed in trouble condition after a schedule h10 in FIG. 5 is transferred and assigned thereto and the terminal 13 for the machine equipment N is flagged to indicate its available condition, the rest of the schedule h10 is assigned to the machine equipment N, since it is indicated in the schedule file 22 shown in FIG. 5 that the product "PO10" can be processed by the machine equipment N. For instance, if forty quantities are processed before an occurrence of the trouble, the rest of twenty quantities will be assigned to the machine equipment N.

Figure 7:
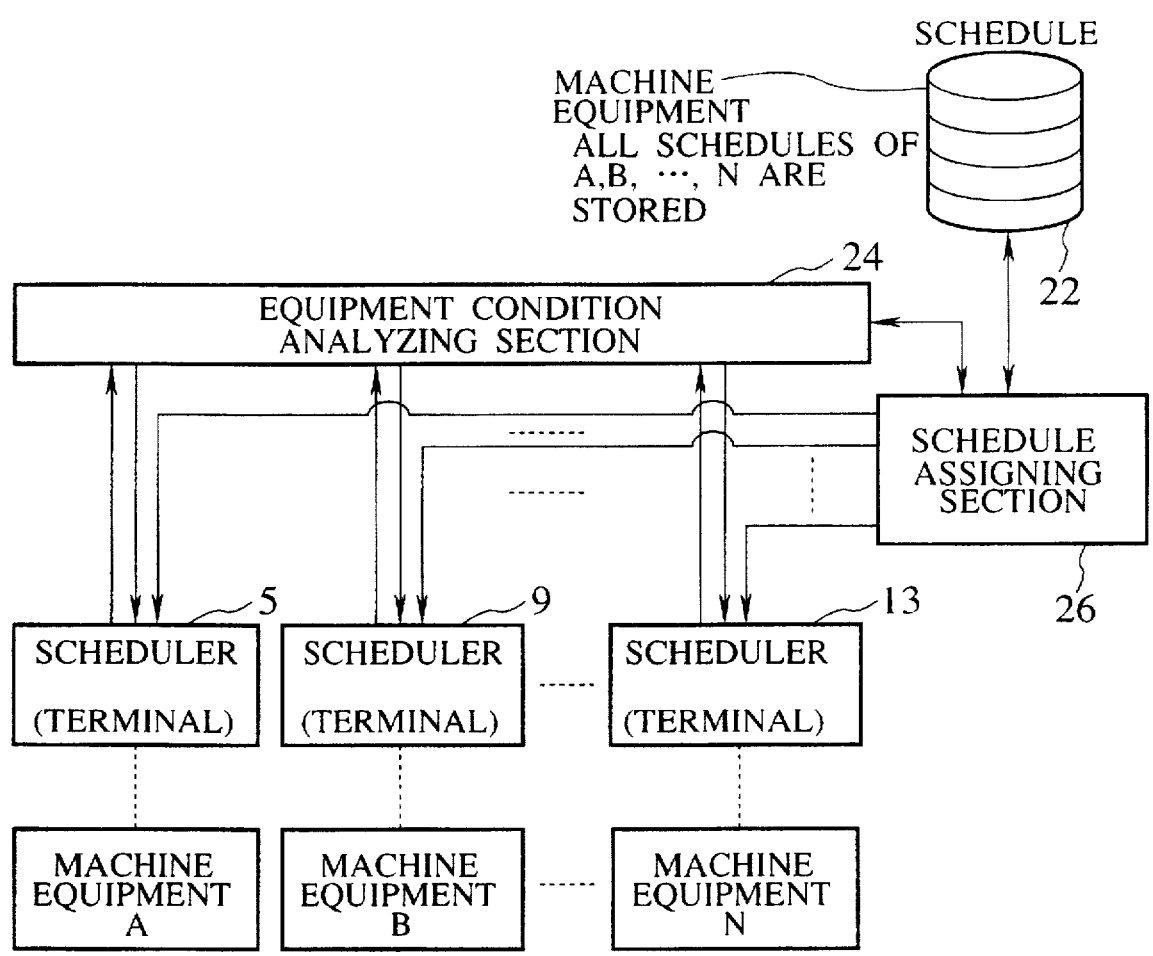
FIG. 7 is an explanatory view of a concept of the first embodiment.

Namely, in the first embodiment of this invention illustrated in FIG. 7, all schedules of each machine equipment are collectively stored in the schedule file 22. From this schedule file 22, first, the schedule assigning section 26 transmits the schedule hi for each machine equipment of the machine equipment A, the machine equipment B, ... and the machine equipment N to the scheduler of each terminal. After that, the machine equipment condition analyzing section 24 analyzes the operation condition of each machine equipment from each terminal, and based on this analyzed condition result, the schedule assigning section 26 retrieves the machine equipment name Pi capable of processing from the schedule file 22, thereby to sequentially assign a schedule to a scheduler of each terminal which can process the schedule.

Accordingly, there will be no machine equipment which is continuously put in the waiting condition or over-loaded condition. Further more, even if there is a troubled machine equipment, a substitutive machine compensates the schedule of the troubled machine equipment.

Consequently, without bringing down the system to transfer the schedule by an operating planner, the operating time of each machine is automatically equaled.

<Embodiment 2>

According to the first embodiment as described above, the schedules for each machine equipment are automatically transferred without being processed by the operating planner, however, there is a case where a program has to be re-written in order that the schedule is transferred to another machine equipment to carry out a desired processing.

For example, the same punching-press is processed before and after transferring, but the same tool is not always set in the same station. Most of the cases, different tools are set thereto. In some cases, the punching-press is processed by laser.

In this second embodiment, there is provided a controller having a machining program converting section for automatically generating a machining program to be processed by the substitutive machine when the substitutive machine is determined.

Figure 8:
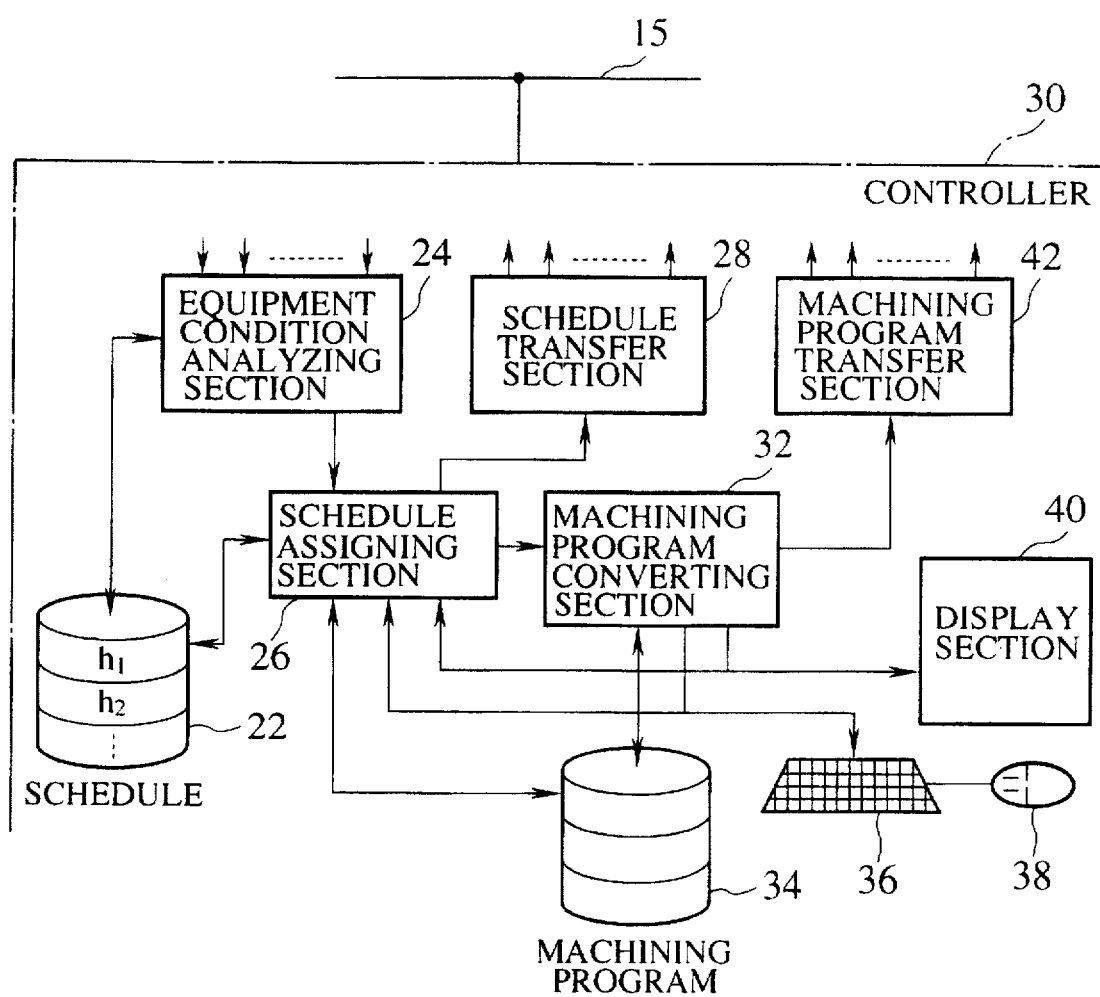
FIG. 8 is a schematic view showing a structure of a controller of a second embodiment of this invention.

FIG. 8 shows a schematic view of a structure of the controller of the second embodiment according to this invention. A controller 30 illustrated in FIG. 8, comprises the schedule file 22, the equipment condition analyzing section 24, the schedule assigning section 26, the schedule transfer section 28, a machining program converting section 32, a machining program file 34, and a machining program transfer section 42.

The machining program converting section 32, when the schedule hi is assigned to the substitutive machine equipment by the schedule assigning section 26, retrieves the machining program of the substitutive machine from the machining program file 34 to deliver the machining program to the machining transfer section 42.

In addition, the machining program converting section 32 is connected to a keyboard 36, a mouse 38, and a display section 40, stores input information of the keyboard 36 or the mouse 38 in the machining program section 34, and displays the input information or a converting machining program on the display section 40.

Further, the machining program file 34 stores therein a plurality of the machining programs of each machine equipment.

Figure 9:
FIG. 9 is an explanatory view of the second embodiment.

FIG. 9 shows an example of converting a machining program or level, such as a simple G-code level, when the schedule of machine equipment C as an NCT1 is converted to machine equipment D as an NCT 2 by the controller 30.

For example, when the machine equipment C is placed in troubled condition, the rest of the schedule hp is assigned to the machine equipment D as a substitutive machine DP by the schedule assigning section 26, the machining program converting section 32 as shown in FIG. 9 retrieves the machining program (the original program) of the schedule of the machine equipment C from the machining program file 34, thereby to draw the machining program of the machine equipment D corresponding to the original machining program from the machining program file 34.

Thereafter, the drawn machining program is transmitted as a converted program to the machining program transfer section 42.

The machining program transfer section 42 reads information about to which machine equipment the converted program is transferred from the schedule assigning section 26, and transfers the converted program based on the information.

In short, according to the second embodiment of this invention, when the machining schedule is transferred to the substitutive machine, the machining program of the suitable substitutive machine is transmitted together with the machining schedule.

Accordingly, even with the different tool, or different equipment, it is possible to continue processing by automatically assigning the schedule to the machine equipment without any attendance of people.

<Embodiment 3>

Figure 10:
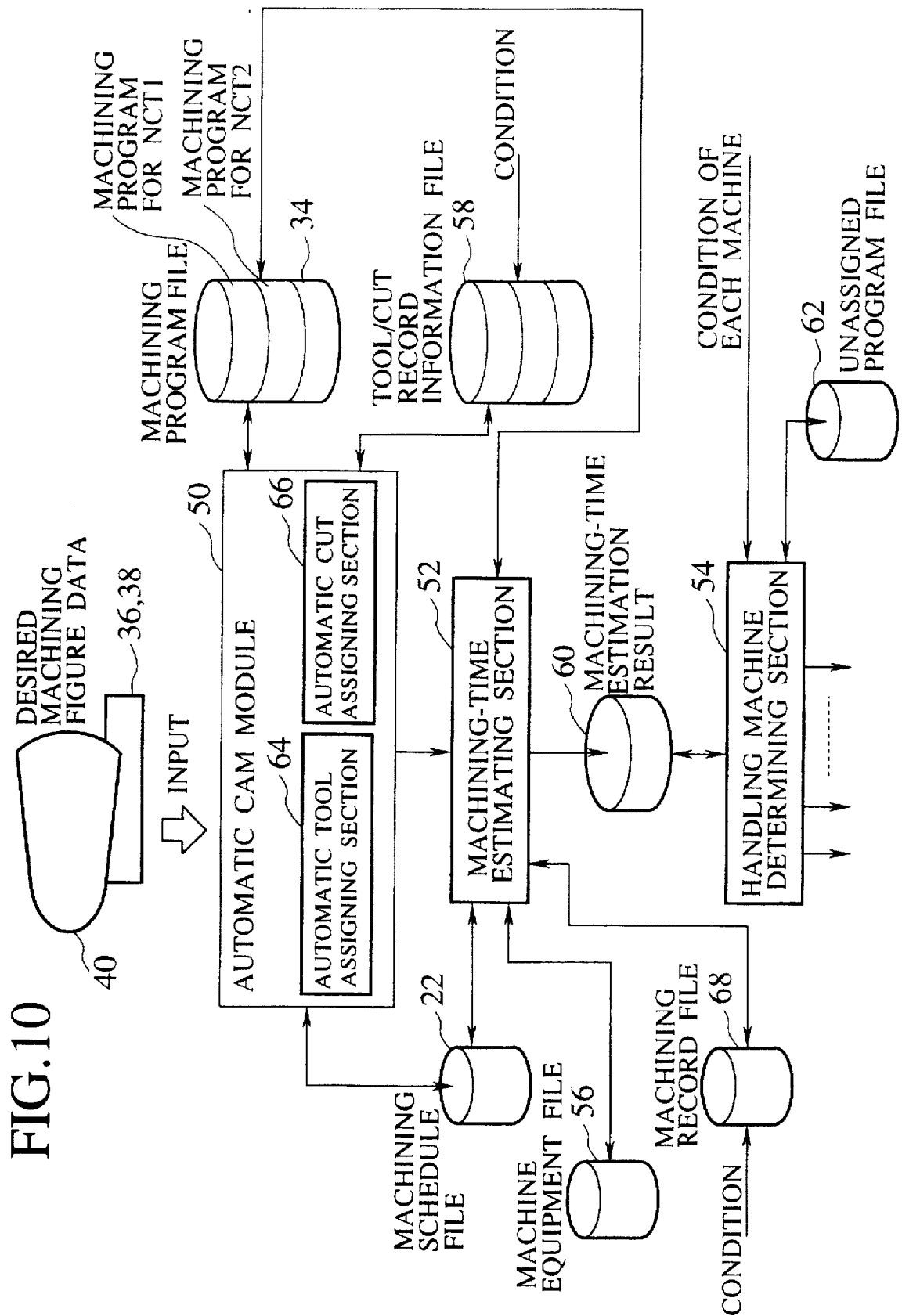
FIG. 10 is a schematic view showing a structure of a controller of a third embodiment.

FIG. 10 is a view showing a structure of a controller of the machine tool control system of third embodiment according to this invention. According to this embodiment as shown in the same FIG. 10, the schedule assigning section 26 consists of an automatic CAM module 50, an machining-time estimating section 52, and a handling machine determining section 54.

This controller comprises the machining schedule file 22 for storing a plurality of machining schedules, a machining program file 34 for storing a plurality of machine programs corresponding to each machine equipment, a machine equipment file 56 for storing a machine equipment parameter such as a turret replacing time and an axis driving time, etc. of each machine equipment, a tool/cut record information file 58 for storing the current tool of each machine equipment and the number of cutting, a machining-time estimation result file 60 for storing an estimated machining time Ti when some product is processed based on the generated machining program, and an estimated machining complete time Ei estimated based on a machining record data shortly generated before, an unassigned program file 62 for storing unassigned machining programs among generated machining programs, and a machining record file 68 for storing a previous machining record time of each machine equipment.

The automatic CAM module 50 comprises at least an automatic tool assigning section 64 and an automatic cut assigning section 66.

Further the automatic CAM module 50 reads desired machining figure data prepared by a CAD (not shown) to generate a machining program Wi which specifies procedure at a time when a workpiece is processed according to this desired machining figure data.

The automatic tool assigning section 64 generates the machining program based on the current condition of tool information of a turret punch press machine in the tool/cut record information file 58, wherein the machining program is for carrying out processing of the tool assignment corresponded to the turret punch press according to the desired machining figure data, thereby to store this machining program in the machining program file 34.

The automatic cut assigning section 66 generates the machining program based on the current condition of the laser tool information of the laser processing machine in the tool/cut record information file 58, wherein the machining program is for carrying out the processing of the cutting assignment corresponded to the laser processing machine according to the desired machining figure data, thereby to store this machining program to the machining program file 34.

The machining-time estimating section 52, when machining program Wi is generated in the machining program file 34, reads the data from the machining schedule file 22, the machine equipment file 56, and the tool/cut record information file 58 etc., and the machining-time estimating section 52 obtains a estimated machining time of each machine equipment according to these data and stores the obtained estimated machining time to the machining-time estimation result file 60.

The handling machine determining section 54 reads current condition of each machine equipment to determine the handling machine equipment based on this condition, the previous machining record time of each machine equipment, and the estimated machining complete time Ei in the machining-time estimation result file 60, etc.

Figure 11:
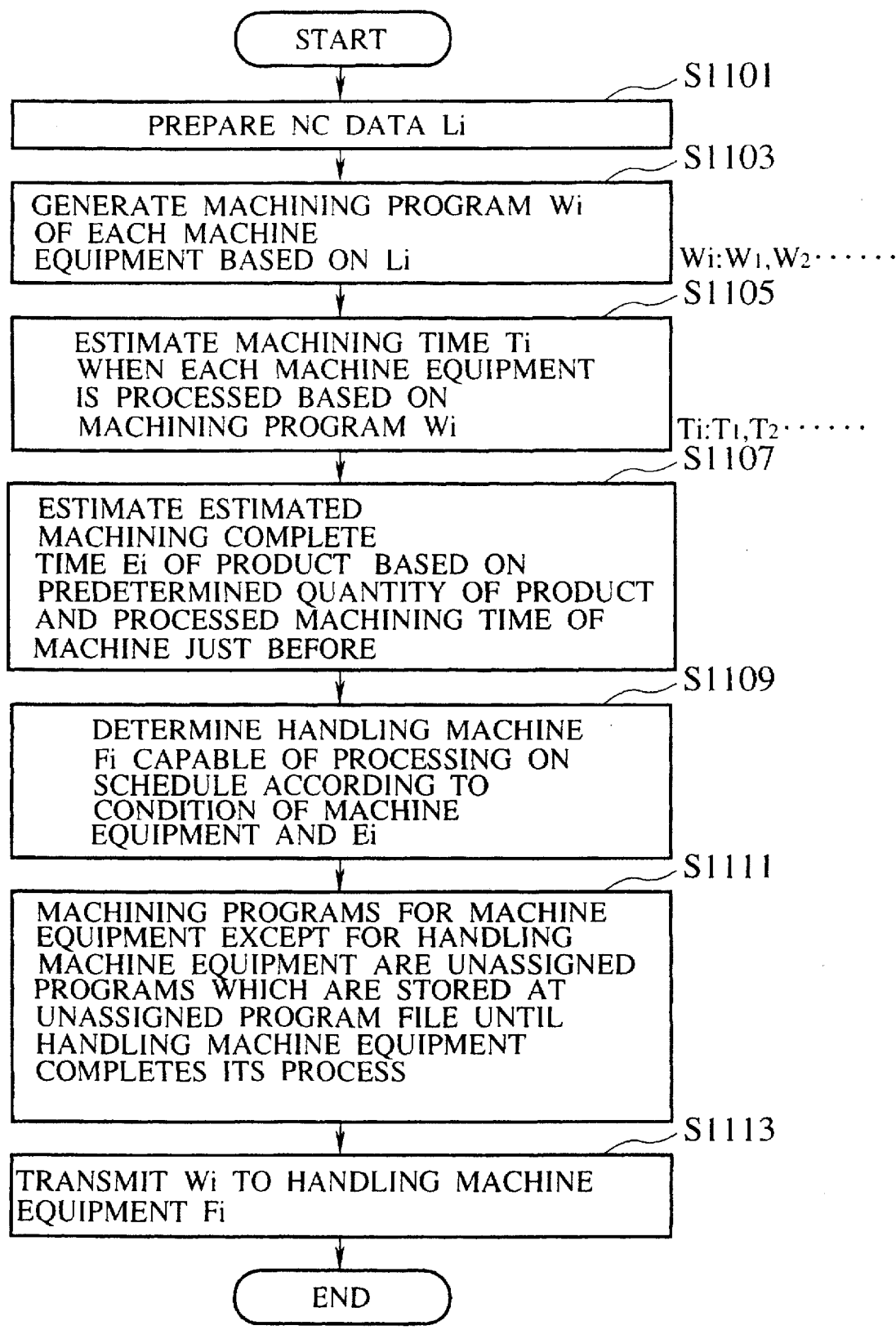
FIG. 11 is a flow chart explaining an operation of the third embodiment.

The detailed description will now proceed to an operation of the schedule assigning section 26 described above referring to FIG. 11.

For example, the automatic CAM module 50 reads a schedule hi of today from the schedule file 22 to prepare a NC data Li for producing a product which corresponds to this schedule hi (Step 1101).

Thereafter, a machining program Wi of each machine equipment is generated based on this NC data Li (S1103), however, except for unproducible products (Forming process cannot be made by laser).

An example of the machining program Wi generated by this step 1103 will be described as followings. For example, while disposed two punch press machines (NCT1; machine equipment C, NCT2; machine equipment D), and a laser processing machine (machine equipment E), when the desired machining figure as shown in FIG. 12 is input as the CAD data, the automatic tool assigning section 64 and the automatic cut assigning section 66, based on the following operation, generate the machining program Wi which corresponds to each machine equipment.

Figure 12:
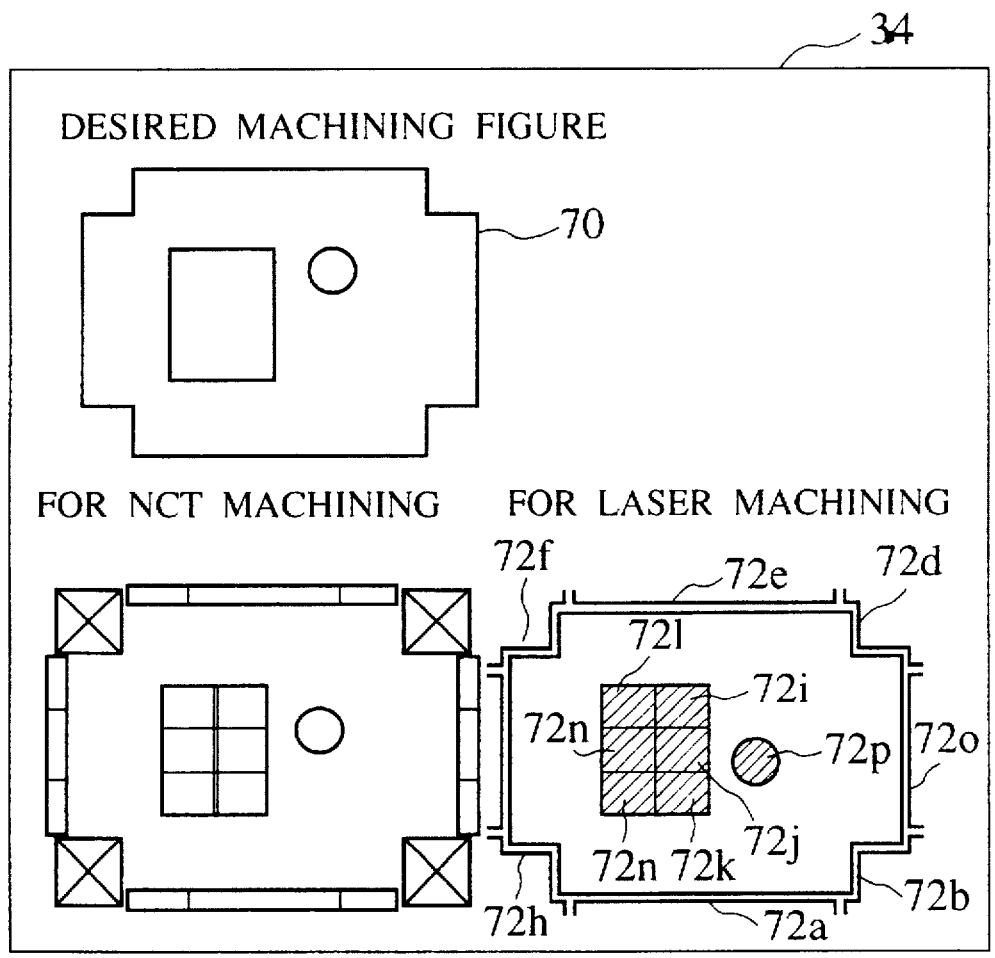
FIG. 12 is an explanatory view showing a tool assignment and a cutting assignment in the third embodiment.

The automatic tool assigning section 64 reads information of tools, which are currently set to the NCT1 (machine equipment C) and the NCT2 (machine equipment D), from the tool/cut record information file 58, and reads a desired machining figure data 70 as shown in FIG. 12.

Thereafter, the automatic tool assigning section 64 generates the machining program for the NCT1 and the machining program for the NCT2, wherein the machining program for the NCT1 is for processing each edge of this desired machining figure data 70 based on the current tool information of the NCT1 (machine equipment C), and the machining program for NCT2 is for processing based on the current tool information of the NCT2 (machine equipment D), to store the machining programs to the machining program file 34.

Referring to FIG. 12, it is shown that the machining program for NCT1 ,which is for pressing four corners by a die and for pressing other edges by a molder's die, and the machining program for NCT2 are generated.

Further, the automatic cut assigning section 66 generates the machining program for laser, which processes the edge determined by the desired machining figure data 70 based on the current laser tool information of a laser processing machine (machine equipment E), and stores the machining program for laser into the machining program file 34.

Referring to FIG. 12, it is shown that the machining program for laser, which processes each edge determined by the desired machining figure data 70 by the laser according to the procedures of 72a to 72p, is generated.

Further, the machining-time estimating section 52 estimates a machining time Ti (hereinafter called "estimated machining time Ti") in the case when each machine equipment processes the products based on machining program Wi generated by the step 1103 (Step 1105).

Thereafter, the machining-time estimating section 52 reads the delivery time of the product, the predetermined quantity of the product, and unoperated schedule of each machine equipment, also reads a processed machining time of a machine just before from the machining record file 68. Further the machining-time estimating section 52 reads machine parameter data from the machine parameter file 56. In accordance with these data, an estimated machining complete time Ei of each machine is estimated when the product is processed based on the generated machining program, and the estimated machining complete time Ei is stored at the machining-time estimation result file 60 (Step 1107).

The step 1107 uses the data of the machine parameter comprising a P replacing time of the turret, an axis moving time, a punching time, and an servo time and the like.

After the estimated machining complete time Ei of each machine equipment is obtained by the step 1107, the handling machine determining section 54 determines a handling machine equipment which is capable of carrying out processing on the schedule according to the current condition of each machine equipment and the estimated machining complete time Ei (Step 1109).

The machining programs for the machine equipment except for the handling machine equipment are unassigned programs which are stored at the unassigned program file 62 until the handling machine equipment completes its process (Step 1111).

This unassigned programs are stored in such a way that they can be immediately assigned to a substitutive machine equipment when, for example, a certain trouble of the handling machine equipment is occurred.

Further, the machining program ,which is generated for the handling machine equipment decided at step 1109, is transmitted to a machining program transfer section, and the machining program transfer section make the terminal of the handling machine equipment transfer the machining program (Step 1113).

Namely, according to the embodiment 3, the machining complete time of the machining program, which is generated based on a machining time just before, etc., of each machine equipment, is estimated to decide the handling machine.

Further, the machining program of each machine equipment on being assigned with a schedule is generated in advance, and stored. When a handling machine or a substitutive machine is selected, the stored machining program corresponding to the handling machine or the substitutive machine is to be transferred.

Accordingly, even if the schedule is assigned to other machine equipment, there is no need to remake the pre-stored machining program for the substitutive machine.

In accordance with an aspect of this invention as described above, the conditions of the plurality of machine equipment of the machine tool control system are constantly recognized by the controller. According to this recognized result, each machine equipment currently selects an available schedule for machining, and transfers the schedule to each terminal corresponded thereto. Therefore, the schedule is automatically assigned to the available machine for machining of which effect is secured without having the replacement of schedule by the operating planner.

In addition, according to another aspect of this invention, when the recognized result shows that a machine equipment exists which is in the condition of overloaded, the substitutive machine which is capable of processing the schedule transferred to the overloaded machine equipment is retrieved from the schedule file to assign the schedule to the retrieved substitutive machine.

Accordingly, even if the operating planner does not assign the schedule from the overloaded machine equipment to the available machine equipment by the manual operation, part of the schedule is automatically assigned to the available machine equipment.

In addition, according to another aspect of this invention, when the recognized result shows that a machine equipment exists which is in trouble condition, the substitutive machine which is capable of processing the schedule transferred to the machine equipment in the trouble condition, is retrieved from the schedule file to assign the rest, which has not been performed, of the schedule to the retrieved substitutive machine.

Accordingly, even if the operating planner does not assign the rest of the schedule from the machine equipment in the trouble condition to the substitute equipment by the manual operation, the rest of schedule is automatically assigned to the available substitutive machine.

Further, according to another aspect of this invention, when the schedule is distributed or assigned to the substitutive machine, it is determined whether or not the machining program which corresponds to the machine equipment in overloaded condition or troubled condition is compatible for the substitutive equipment. Thereafter, when the machining program is not compatible therein, the machining program may be converted into the compatible machining program for the substitutive machine.

Accordingly, it is secured for the effect that there is no need to remake the machining program for the substitutive machine.

Furthermore, according to the another aspect of this invention, based on the machining program, the machine equipment parameter, the tool record information, and the cutting record information, the estimated machining time in each machine equipment is previously obtained, and the current condition of each machine equipment is read to decide the handling machine equipment based on the current condition, the previous processing record time, and the estimated machining time.

Consequently, it is possible to automatically assign the schedule and the machining program to a suitable substitutive machine which is capable of perform the processing in the quickest way.

It should be understood that many modifications and adaptations of the invention will become apparent to those skilled in the art and it is intended to encompass such obvious modifications and changes in the scope of the claims appended hereto.

What is claimed is:

1. A machine tool control system which controls a plurality of machining equipment, each of said plurality of machining equipment being provided with a terminal device to communicate with said machine tool control system, said machine tool control system comprising:

means for storing a plurality of schedules for said plurality of machining equipment;

means for analyzing a current operating condition of each of said plurality of machining equipment based on equipment status information received from said terminal device;

means for selecting a schedule from said plurality of schedules that is capable of being processed based on the current operating condition of each of said plurality of machining equipment; and means for transferring said schedule selected by said selecting means to one of said plurality of machining equipment;

said system further comprising a machining program file including a plurality of machining programs for said plurality of machining equipment, and a machining program converting system that converts an original machining program corresponding to one of said plurality of machining equipment into a compatible machining program for a substitutive machining equipment when the current operating condition of said one of said plurality of machining equipment is analyzed by said analyzing means to be in an overload condition or a trouble condition, and when said machine program converting system determines that the original machining program is not compatible for said substitutive machining equipment.

2. The machine tool control system according to claim 1, wherein said storing means comprises a schedule file that stores said plurality of schedules, each of said schedules including scheduling information comprising a product name, a quantity amount for the products to be produced, a delivery time, and a machine equipment name of each of said machining equipment that can produce the product.

3. The machine tool control system according to claim 2, wherein said analyzing means comprises an equipment condition analyzing system that receives said equipment status information from said terminal device of each of said plurality of machining equipment to analyze said current operating condition of said plurality of machining equipment.

4. The machine tool control system according to claim 3, wherein said selecting means comprises a schedule assignment system that retrieves a schedule from said schedule file based on said current operating condition analyzed by said equipment condition analyzing system and assigns the retrieved schedule to one of said plurality of machining equipment.

5. A machine tool control system according to claim 4, wherein said schedule assignment system comprises:

a CAM system that reads a machining figure data generated by a CAD system and generates a machining program which specifies a machining procedure based on said machining figure data;

a machining-time estimating system that estimates a machining time for each of said plurality of machining equipment based on said machining program, a machine equipment parameter, tool record information, and cut record information; and a handling machine determining system that determines where to assign said schedule based on the current operating condition of each of said plurality of machining equipment, a previous machining record times information of each of said plurality of machining equipment, and said estimated machining time.

6. A machine tool control system according to claim 5, further comprising:

a machine equipment file including said machining equipment parameter;

a tool/cut record information file including said tool record information and said cut record information;

a machining-time estimation result file including said estimated machining time for each of said plurality of machining equipment; and a machining record file including said previous machining record times information of each of said plurality of machining equipment.

7. The machine tool control system according to claim 4, wherein said transferring means comprises a schedule transfer system that transfers said schedule assigned by said schedule assignment system to a terminal device of one of said plurality of machining equipment.

8. The machine tool control system according to claim 7, wherein said schedule is assigned by said schedule assignment system when the current operating condition analyzed by said equipment condition analyzing system indicates that said one of said plurality of machining equipment is in a waiting condition to receive an instruction for processing.

9. The machine tool control system according to claim 7, wherein said schedule assignment system, when the current operating condition analyzed by said equipment condition analyzing system indicates that said one of said plurality of machining equipment is in an over-load condition, retrieves from said schedule file a machine equipment name of a substitutive machining equipment capable of processing said schedule transferred to said machining equipment which is in said over-load condition, and assigns the schedule to said substitutive machining equipment.

10. The machining tool control system according to claim 9, wherein said schedule assignment system, when said current operating condition analyzed by said equipment condition analyzing system indicates that said one of said plurality of machining equipment is in a trouble condition, retrieves from said schedule file a machine equipment name of a substitutive machining equipment capable of processing said schedule transferred to said machining equipment which is in said trouble condition, and assigns the schedule to said substitutive machining equipment.

11. A machine tool control system according to claim 10, further comprising a machining program transfer system that transfers said compatible machining program converted by said machining program converting system to said substitutive machining equipment.

12. The machine tool control system according to claim 1, wherein said equipment status information comprises equipment condition information, said equipment condition information comprising an over-loaded condition, a trouble condition, and a waiting condition.

13. The machine tool control system according to claim 12, wherein each of said schedules include scheduling information comprising a product name, a quantity amount of the products to be produced, a machine equipment name of each specified machining equipment of said plurality of machining equipment to produce said quantity of products, a delivery time, and a machine program to be run by said specified machining equipment.

14. The machine tool control system according to claim 13, wherein said delivery time comprises a time period in which said scheduling information is to be transferred to said specified machining equipment.

15. The machine tool control system according to claim 14, wherein when said equipment status information of said specified machining equipment is said over-loaded condition or said trouble condition, another of said specified machining equipment is selected by said selecting means to receive said schedule.

16. The machine tool control system according to claim 15, wherein if said equipment status information of said specified machining equipment is said trouble condition, a remaining quantity of said quantity of products to be produced is assigned by said selecting means to be produced by said another of said machining equipment.

17. The machine tool control system according to claim 16, wherein said machine program converting system generates a substitute machine program for said another of said machining equipment based on said machine program to be run by said specified machining equipment.

18. The machine tool control system according to claim 17, wherein said machine program converting system comprises a machine program database which stores machining programs for said plurality of machining equipment.

19. The machine tool control system according to claim 18, said machine program converting device being adapted to convert a G-code machine program.

20. The machine tool control system according to claim 1, further comprising a CAM device that reads a machining figure data generated by a CAD system and generates a machining program which specifies a machining procedure based on said machining figure data, and a machining-time estimating system that estimates a machining time for each of said plurality of machining equipment based on said machining program, a machine equipment parameter, tool record information, and cut record information.

21. The machine tool control system according to claim 20, further comprising a tool/cut database comprising said tool record information and said cut record information related to said plurality of machining equipment.

22. A machine tool control system which controls a plurality of machining equipment, each of said plurality of machining equipment being provided with a terminal device to communicate with said machine tool control system, said machine tool control system comprising:

a schedule file that includes a plurality of schedules for said plurality of machining equipment;

an analyzing system that determines the current operating condition of each of said plurality of machining equipment based on equipment status information received from said terminal device;

a schedule selection system that selects a schedule from said plurality of schedules that is capable of being processed based on the current operating condition of each of said plurality of machining equipment; and a schedule transferring system that transfers said schedule selected by said schedule selection system to one of said plurality of machining equipment;

said system further comprising a machining program file including a plurality of machining programs for said plurality of machining equipment, and a machining program converting system that converts an original machining program corresponding to one of said plurality of machining equipment into a compatible machining program for a substitutive machining equipment when the current operating condition of said one of said plurality of machining equipment is analyzed by said analyzing system to be in an overload condition or a trouble condition, and when said machining program converting system determines that the original machining program is not compatible for said substitutive machining equipment.

23. The machine tool control system according to claim 22, wherein each of said schedules include scheduling information comprising a product name, a quantity amount for the products to be produced, a delivery time, and a machine equipment name of each of said machining equipment that can produce the product.

24. The machine tool control system according to claim 23, wherein said analyzing system comprises an equipment condition analyzing system that receives said equipment status information from said terminal device of each of said plurality of machining equipment to analyze said current operating condition of said plurality of machining equipment.

25. The machine tool control system according to claim 24, wherein said schedule selection system comprises a schedule assignment system that retrieves a schedule from said schedule file based on said current operating condition analyzed by said equipment analyzing system and assigns the retrieved schedule to one of said plurality of machining equipment.

26. The machine tool control system according to claim 25, wherein said schedule transferring system transfers said schedule assigned by said schedule assignment system to a terminal device of one of said plurality of machining equipment.

* * * * *